(12) United States Patent
Hofbauer et al.

(10) Patent No.: US 9,133,932 B2
(45) Date of Patent: Sep. 15, 2015

(54) PUSHROD CONNECTION TO A JOURNAL

(75) Inventors: Peter Hofbauer, West Bloomfield, MI (US); Adrian Tusinean, Windsor (CA)

(73) Assignee: EcoMotors, Inc., Allen Park, MI (US)

( * ) Notice: Subject to any disclaimer, the term of this patent is extended or adjusted under 35 U.S.C. 154(b) by 745 days.

(21) Appl. No.: 13/437,207

(22) Filed: Apr. 2, 2012

(65) Prior Publication Data
US 2012/0247419 A1    Oct. 4, 2012

Related U.S. Application Data

(60) Provisional application No. 61/471,236, filed on Apr. 4, 2011.

(51) Int. Cl.
| | |
|---|---|
| F16C 3/04 | (2006.01) |
| F16J 7/00 | (2006.01) |
| F02B 75/24 | (2006.01) |
| F02B 75/28 | (2006.01) |
| F16C 7/02 | (2006.01) |

(Continued)

(52) U.S. Cl.
CPC ................. F16J 7/00 (2013.01); F02B 75/243 (2013.01); F02B 75/246 (2013.01); F02B 75/282 (2013.01); F16C 7/023 (2013.01); F16C 9/04 (2013.01); F16C 17/022 (2013.01); *Y10T 29/49826* (2015.01); *Y10T 29/49959* (2015.01); *Y10T 29/49963* (2015.01)

(58) Field of Classification Search
CPC ............. F16C 7/00; F16C 7/023; F16C 7/06; F16C 9/02; F16C 9/04; F16C 17/022; F16J 7/00; Y10T 29/49963; Y10T 29/49826; F02B 75/243; F02B 75/282; F02B 75/246

USPC ................... 123/197.3, 197.4; 74/579 R, 593
See application file for complete search history.

(56) References Cited

U.S. PATENT DOCUMENTS

| | | | | |
|---|---|---|---|---|
| 736,458 | A | * | 8/1903 | Sturtev ............................ 74/580 |
| 1,186,341 | A | * | 6/1916 | Senderling ...................... 74/580 |
| 1,286,852 | A | * | 12/1918 | Watson ........................... 74/580 |

(Continued)

FOREIGN PATENT DOCUMENTS

| | | |
|---|---|---|
| CN | 1239195 A | 12/1999 |
| CN | 2594522 Y | 12/2003 |
| GB | 635167 A | 4/1950 |

OTHER PUBLICATIONS

Sammons, H. and Chatterton, E., "Napier Nomad Aircraft Diesel Engine," SAE Technical Paper 550239, 1955.

(Continued)

*Primary Examiner* — Marguerite McMahon
(74) *Attorney, Agent, or Firm* — Barnes & Thornburg LLP

(57) ABSTRACT

Reciprocating motion can be converted to rotary motion through a crankshaft and a connecting rod. In a connecting rod that is primarily in compression, two opposing connecting rods can be coupled to a single journal. Two bearing shell portions are placed over the journal with a pushrod placed over each bearing shell portion. The pushrods are normally in compression. To overcome the potentiality of the pushrods briefly being in tension, retainers can be coupled to the pushrods. Because both pushrods are coupled in-line, the width of the journal that can accommodate these pushrods is shorter than for a journal on which the two pushrods are side by side. The crankshaft can be shorter, stronger, and lighter weight.

13 Claims, 7 Drawing Sheets

(51) Int. Cl.
*F16C 9/04* (2006.01)
*F16C 17/02* (2006.01)

(56) References Cited

U.S. PATENT DOCUMENTS

| 6,209,510 | B1 * | 4/2001 | Brogdon et al. | 123/197.4 |
| 8,763,583 | B2 * | 7/2014 | Hofbauer et al. | 123/197.3 |
| 8,844,494 | B2 * | 9/2014 | Tusinean et al. | 123/197.3 |
| 2004/0177824 | A1 * | 9/2004 | Decuir | 123/192.2 |
| 2009/0223479 | A1 | 9/2009 | Schoell | |
| 2010/0229836 | A1 | 9/2010 | Hofbauer | |
| 2011/0303183 | A1 * | 12/2011 | Zottin et al. | 123/197.3 |
| 2012/0073538 | A1 | 3/2012 | Hofbauer | |

OTHER PUBLICATIONS

First Notification of Office Action of counterpart Chinese Patent Application No. 201210096501.5 issued by The State Intellectual Property Office of P.R. China on May 7, 2015.

* cited by examiner

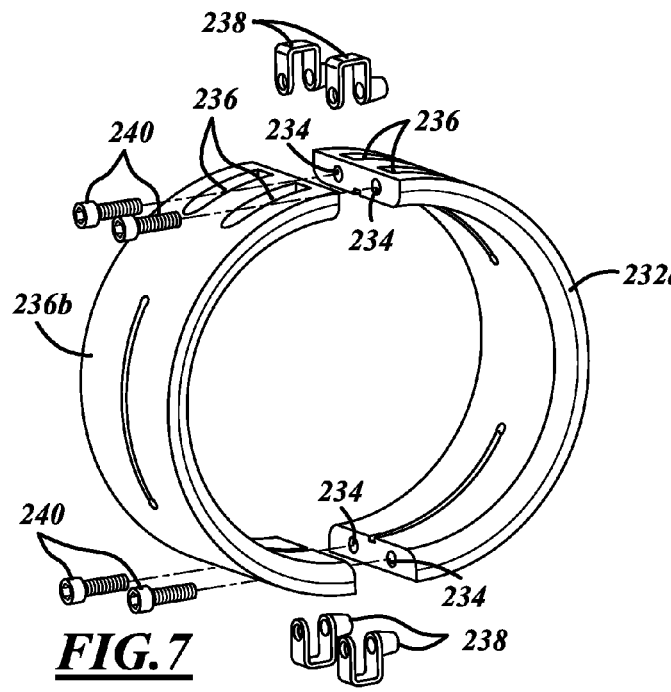
FIG.7
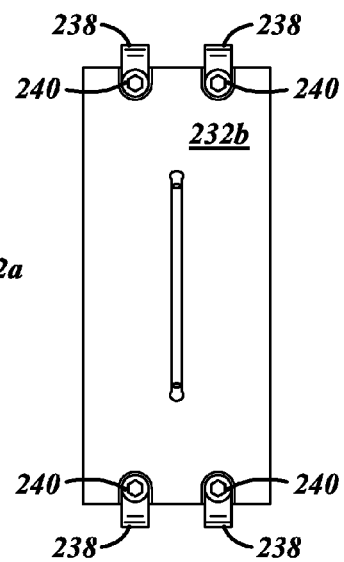
FIG.9
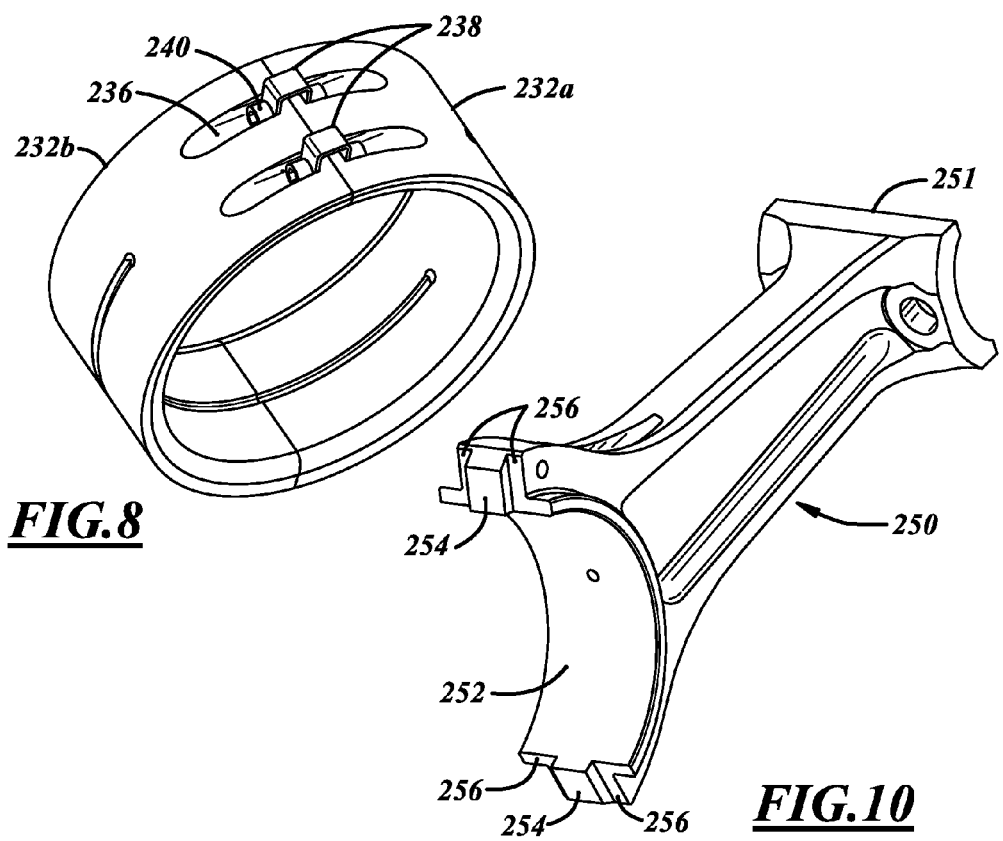
FIG.8
FIG.10

PUSHROD CONNECTION TO A JOURNAL

CROSS REFERENCE TO RELATED APPLICATIONS

The present application claims priority benefit from U.S. provisional patent application 61/471,236 filed 4 Apr. 2011.

FIELD

The present disclosure relates to a pushrod connection to a journal of a rotating member.

BACKGROUND

In FIG. 1, an opposed-piston, opposed-cylinder (OPOC) engine 10 is shown isometrically. An intake piston 12 and an exhaust piston 14 reciprocate within each of first and second cylinders (cylinders not shown to facilitate viewing pistons). The inner pistons 12' and 14 couple to a journal (not visible) of crankshaft 20 via pushrods 16. The outer pistons 12 and 14' couple to two journals (not visible) of crankshaft 20 via pullrods 18, with each outerpiston 12 having two pullrods 18. The first and second cylinders in which the pistons reciprocate are parallel but offset from each other in the y direction due to the pullrods 18 associated with the cylinder shown front and leftward displaced in a negative Y direction with respect to pullrods 18 associated with the cylinder shown rear and rightward. Pushrods 16 are similarly situated with respect to each other. It is cost effective that all four pullrods 18 are identical in design and the two pushrods 16 are the same such as the design shown in FIG. 1. However, a disadvantage of such an offset design is that the engine is wider than it would otherwise be if the two cylinders could be arranged collinearly. Also, a torque is introduced due to the offset of the two cylinders. The combustion chamber shape 24 is shown on the tops of exhaust pistons 14 and 14' and the combustion chamber shape 22 on the top of intake pistons 12 and 12' is not visible in FIG. 1. It is desirable to minimize the number of unique parts in an assembly, but unfortunately the configuration in FIG. 1 includes four different pistons: 12, 12', 14, and 14'.

One alternative to overcome the offset cylinders is a forked rod, such as is described in U.S. Pat. No. 1,322,824, invented by F. Royce. By employing a forked rod/blade rod configuration within the engine of FIG. 1, the cylinders are collinear, but the length of the journal (or crank pin) is greater than the configuration in which the cranks are side by side. The goal of reducing the width of the engine by making the cylinders collinear is offset by the wider crank pin lengths. A disadvantage of such a configuration is that the piston in one cylinder couples with the crankshaft by a forked rod and the corresponding piston in the other cylinder couples with the crankshaft by a blade rod thereby increasing part count for the engine. A system for coupling the rods to the crankshaft is desired which allows common parts to be used in the two cylinders, while allowing collinear cylinders and facilitating a shorter crank pin length.

SUMMARY

A journal and connecting rod assembly is disclosed that allows collinear cylinders while maintaining common parts. The assembly includes a cylindrical journal, a first bearing shell portion placed on the journal, and a second bearing shell portion placed on the journal and secured to the first bearing shell portion. The assembly further includes a first pushrod having a concave portion of a predetermined diameter that nests with a convex surface of the first bearing shell and a second pushrod having a concave portion of the predetermined diameter that mates with a convex surface of the second bearing shell portion. The convex surfaces of the first and second bearing shells portions are of the predetermined diameter. The assembly further includes a U-shaped first retainer coupled to the first pushrod such that the first pushrod and the first retainer encircle the journal and a U-shaped second retainer coupled to the second pushrod such that the second pushrod and the second retainer encircle the journal. The journal and connection rod assembly are coupled with a one-piece or unitary crankshaft. The crankshaft comprises the journal.

The first pushrod includes a first convex shoulder and the second pushrod includes a second convex shoulder. A concave surface of the U-shaped first retainer sits on the convex shoulder; and a concave surface of the U-shaped second retainer sits on the convex shoulder. The first and second U-shaped retainers have first and second tips with a first orifice in the first tip and a second orifice in the second tip. The axes of the orifices are parallel to a central axis of the journal.

First and second orifices are defined in each of the first and second pushrods with a first orifice located near a first end of the concave surface and a second orifice located near a second end of the concave surface. The orifices in the pushrods are parallel to a central axis of the journal. The assembly further includes a pin inserted through each of the first and second orifices in each of the first and second retainers wherein each pin is also inserted into the associated orifice in the associated pushrod. The pin is a substantially straight pin with a snap ring to prevent the pin from sliding longitudinally or a pin with a head at one end and threads on an end away from the head.

Also disclosed in an assembly that includes a crankshaft having three cylindrical journals. The crankshaft is a single piece in contrast to a built-up crankshaft used in some forked connecting rod configurations. First and second bearing shell portions are placed on one of the journals away from an end of the crankshaft. First and second bearing shell portions are fastened together. The assembly further includes: a first pushrod placed over the first bearing shell portion, a second pushrod placed over the second bearing shell portion, a first retainer coupled to the first pushrod, and a second retainer coupled to the second pushrod. The first and second retainers are U-shaped and each pushrod forms a portion of a cylinder at an end of the pushrod proximate the journal. Each pushrod includes a shoulder. A concave portion of the U of the first retainer couples with the shoulder associated with the second pushrod. A concave portion of the U of the second retainer couples with the shoulder associated with the first pushrod.

The first and second retainers have orifices defined in each tip of the U; two orifices defined in each of the pushrods, one located in each end of the cylinder; the orifices are parallel to a central axis of the journal; and one of the orifices of the retainers aligned with one of the orifices of the pushrod, the assembly further comprising: a pin inserted through each of the pairs of aligned orifices. The orifices in the pushrods are threaded, the pins are screws, and the threads of the screws engage with the threads in the associated pushrod.

The assembly further includes a pilot hole in a concave surface of the first bearing shell portion, an axis of the pilot hole being approximately perpendicular with a central axis of the journal, a dowel pin placed in the pilot hole and extending outwardly from the first bearing shell portion, and an orifice in the first pushrod, the orifice being approximately perpendicular with the central axis of the journal wherein the orifice engages with the dowel pin. Relative rotational motion of the first bearing shell portion with respect to the first pushrod is substantially prevented by the pin engaging with the pilot hole in the first bearing shell portion and the orifice in the first pushrod.

The assembly further includes first and second through-hole orifices defined in the first bearing shell portion near an end of the first bearing shell portion; first and second threaded orifices defined in the second bearing shell portion near an end of the second bearing shell portion; a first screw inserted through the first through-hole orifice of the first bearing shell portion and threads of the first screw engaged with the first threaded orifice of the second bearing shell portion; and a second screw inserted through the second through-hole orifice of the first bearing shell portion and threads of the second screw engaged with the second threaded orifice of the second bearing shell portion.

In some embodiments, the first bearing shell portion and the second bearing shell portion have fingers extending outwardly from at least one end of each the first and second bearing shell portions, an orifice is defined in the fingers with an axis of the orifice being substantially parallel to a central axis of the journal, the fingers of the first and second bearing shell portions are enmeshed to form a box joint, and a dowel pin inserted through the orifices in the enmeshed fingers.

In some embodiments, the outer surfaces of the bearing shell portions are substantially convex and sit away from the journal a predetermined amount except in the region proximate where the first and second bearing shell portions fasten together in which at least one of the bearing shell portions has an outward protrusion and the outward protrusion indexes with a gap between the first and second pushrods.

In an alternative embodiment, a first through-hole orifice is defined in the first bearing shell portion near a first end of the first bearing shell portion; a second through-hole orifice is defined in the second bearing shell portion near a first end of the second bearing shell portion; a first U-shaped clip define an orifice at one tip and has a threaded portion at the other tip; and a first bolt passes through the orifice at one tip of the first clip, through the first through-hole orifice, through the second through-hole orifice, and threads into the threaded portion of the first clip.

Some embodiments further include: a third through-hole orifice defined in the first bearing shell portion near a second end of the first bearing shell portion; a fourth through-hole orifice defined in the second bearing shell portion near a second end of the second bearing shell portion; a first U-shaped clip defining an orifice at one tip and having a threaded portion at the other tip; and a first bolt. The second bolt passes through the orifice at one tip of the second clip, through the third through-hole orifice, through the fourth through-hole orifice, and threads into the threaded portion of the second clip.

Yet other embodiments further include: a fifth through-hole orifice defined in the first bearing shell portion near a first end of the first bearing shell portion; a sixth through-hole orifice defined in the second bearing shell portion near a first end of the second bearing shell portion; a seventh through-hole orifice defined in the first bearing shell portion near a second end of the first bearing shell portion; a eighth through-hole orifice defined in the first bearing shell portion near a second end of the first bearing shell portion; third and fourth U-shaped clips each clip defining an orifice at one tip and having a threaded portion at the other tip; and third and fourth bolts. The third bolt passes through the orifice at one tip of the third clip, through the fifth through-hole orifice, through the sixth through-hole orifice, and threads into the threaded portion of the third clip. The fourth both passes through the orifice at one tip of the fourth clip, through the seventh through-hole orifice, through the eighth through-hole orifice, and threads into the threaded portion of the fourth clip.

Also disclosed is a method to assemble the connecting rods onto a journal of the crankshaft. First and second portions of a bearing shell onto the journal are placed on the journal and the two bearing shell portions are fastened together. A first pushrod is placed over the first bearing shell portion. In embodiments in which the first pushrod and the first bearing shell are pinned together, a pin is press fit into the orifice in the pushrod and the pin is engaged with a pilot hole in the bearing shell portion. Alternatively, the pin is pressed into the pilot hole in the bearing shell portion and engages with the orifice in the pushrod during assembly. A second pushrod is placed over the second bearing shell portion. Screws, or other retainer, couple tips of the first and second retainers to the first and second pushrods, respectively.

One advantage of the embodiments disclosed herein is that the width of the journal associated with the two pushrods is approximately one-half the width of the situation as shown in FIG. 1 in which pushrods 16 couple to with crankshaft 20 in a side-by-side arrangement. The crankshaft, according to embodiments in the present disclosure, may be shorter than crankshaft 20. Or, alternatively, the radius of the journal may be reduced in diameter, which also has many benefits. In yet another alternative, the width of the journal is reduced to some extent and the diameter is also reduced. In any of these alternatives, friction in the pushrod-to-bearing connection is reduced.

Various embodiments of the disclosure allow for the two cylinders to be collinear, which allows the engine to be narrower and for the torque by the offset nature of the connecting rods to be eliminated. Also, in such a configuration, the two inner pistons may be identical (either both intake or both exhausts). Similarly, the two outer pistons are identical. This reduces the number of unique parts in the engine assembly.

BRIEF DESCRIPTION OF THE DRAWINGS

FIG. 7 is an embodiment of the bearing shell portions in an exploded view;

FIGS. 8 and 9 are a perspective view and a side view of the embodiment of FIG. 7 as assembled;

FIG. 10 is a pushrod according to one embodiment of the disclosure;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
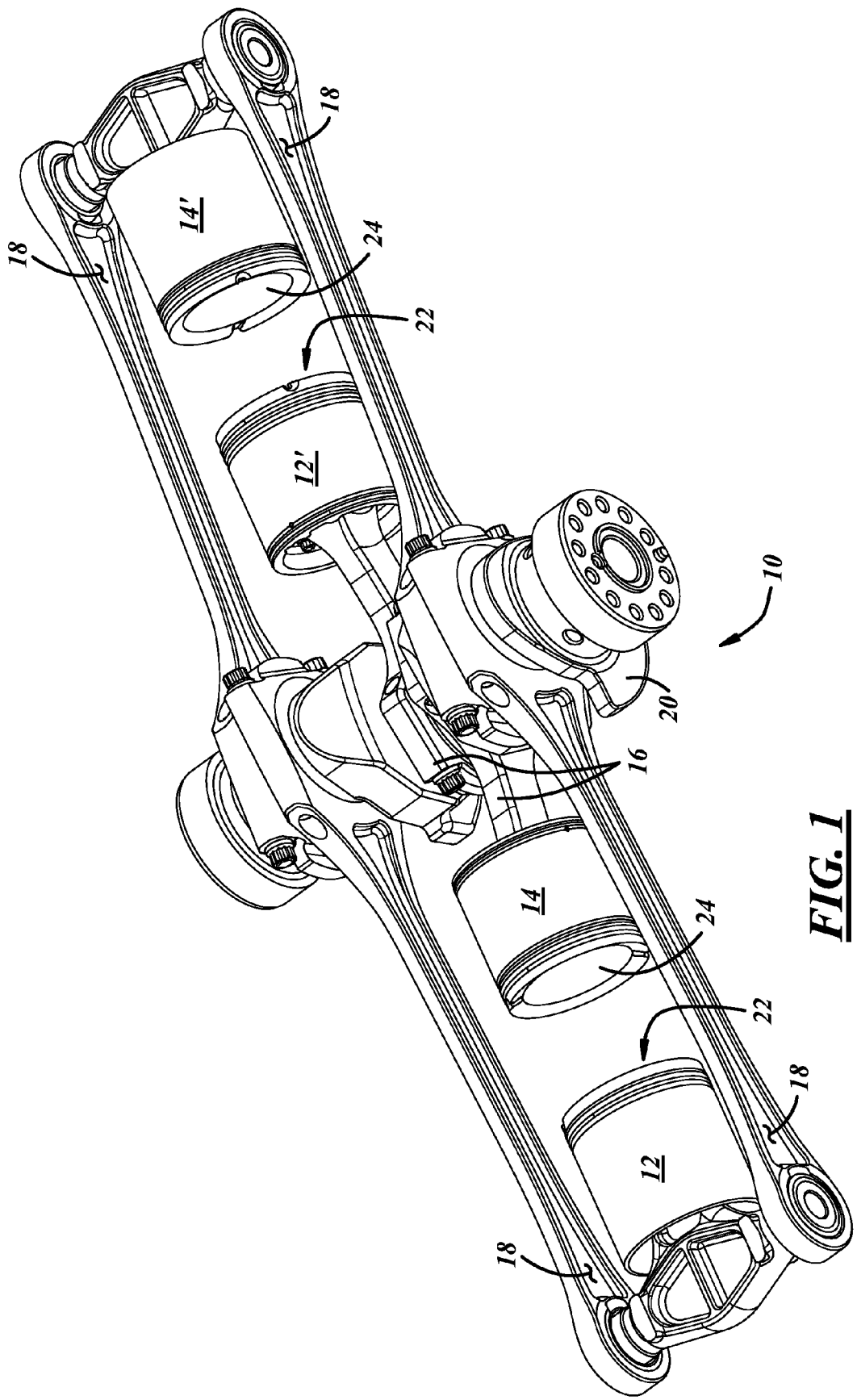
FIG. 1 illustrates an example configuration of an opposed-piston, opposed-cylinder engine in an isometric view.
Figure 2:
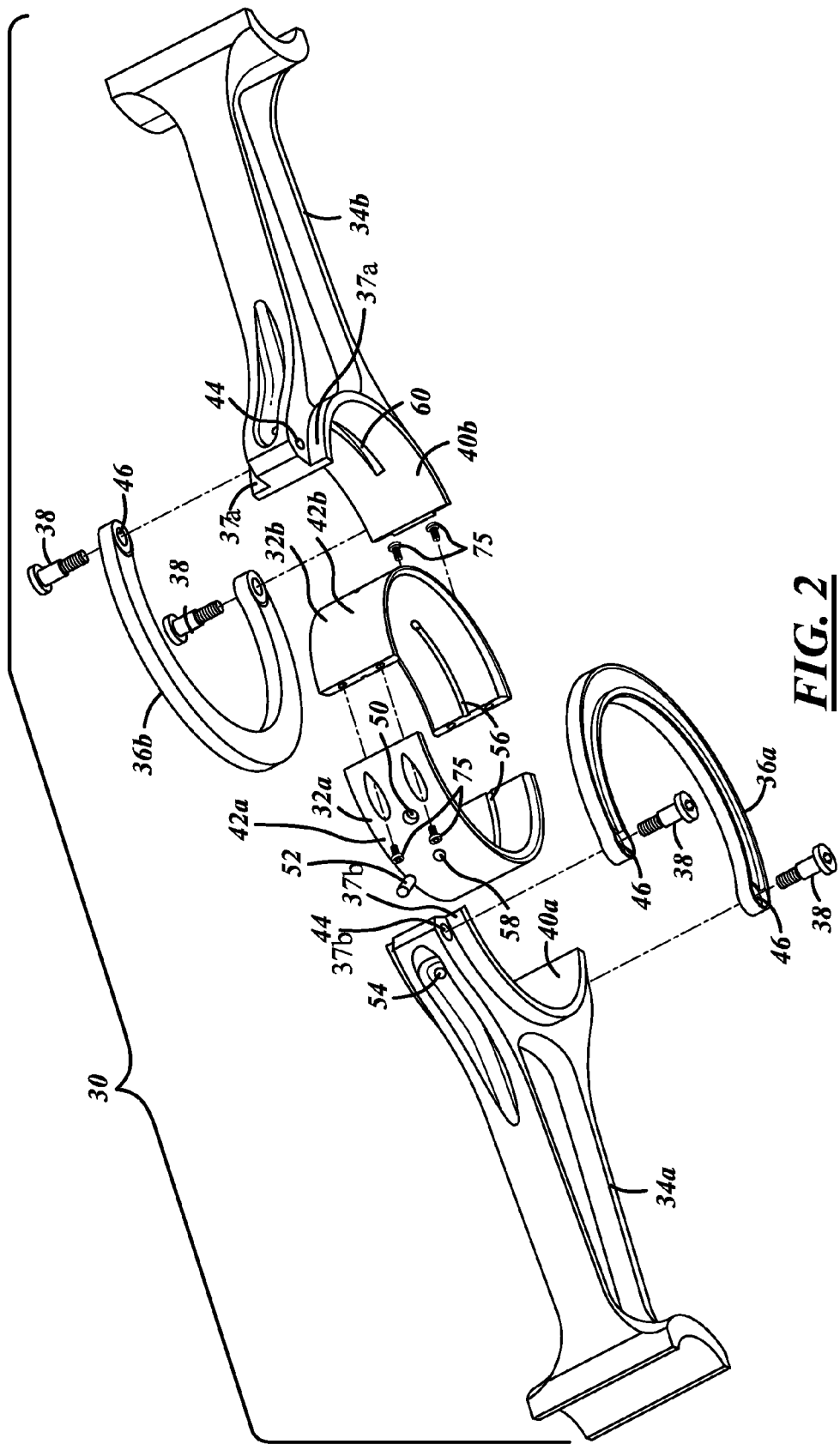
FIG. 2 is an exploded view of a pushrod assembly according to an embodiment of the present disclosure.

An exploded view of a configuration a pushrod assembly 30 in which two pushrods are capable of being coupled to one journal is shown in FIG. 2. Bearing shell portions 32a and 32b couple together around a journal (not shown). Concave surfaces 40a and 40b of pushrods 34a and 34b nest with convex surfaces 42a and 42b of bearing shell portions 32a and 32b. Pushrods 34a and 34b are held in place by retainers 36a and 36b with retainer 36a coupling with pushrod 34a via screws 38 coupling through orifices 44 of pushrod 34a and orifices 46 of retainer 36a. Retainer 36a is horse-shoe shaped with the ends coupling with pushrod 34a and the circular portion nesting with a shoulder 37b on pushrod 34b. Similarly, retainer 36b nests with a shoulder 37a on pushrod 34a. The width, W, of pushrod 34b along the length of the pushrod is wider than the width, Y, near the tips of the concave surface 40b. The narrower width, Y, accommodates the installation of the retainers, one of which is affixed with pushrod 34b and one of which engages on shoulder 37b of pushrod 34b.

In an alternative embodiment, both retainers 36a and 36b are screwed to one of the pushrods, e.g., 34b. In such embodiment, the U-shaped portions of the retainers 36a and 36b ride on the two shoulders 37a and 37b associated with the other of the pushrods 34a. An exploded view of such an embodiment would appear nearly identical as that shown in FIG. 2 except that retainer 36a is rotated with the opening of the horse-shoe shape pointing in the same direction as retainer 36b.

Each of pushrods 34a and 34b, as shown in FIG. 2, have two shoulders 37a and 37b, respectively., i.e., one facing toward the front of FIG. 2 and one on the back side with respect to the view in FIG. 2. An alternative pushrod arrangement is to have only one shoulder on each of the pushrods, i.e., to cooperate with one retainer each. In such a configuration, pushrod 34a would have only the shoulder on the back side and pushrod 34b would have only the one shoulder on the front side as viewed in FIG. 2. Such a configuration reduces the number of machining operations.

In one embodiment, an orifice 54 is formed in pushrod 34a that can align with a pilot hole 50 provided in bearing shell portion 32a when the two are nested. A pin 52 or dowel is press fit into orifice 54 and indexed with pilot hole 50, upon assembly, to prevent relative movement of bearing shell portion 32a and pushrod 34a. In such an embodiment, pushrod 34b moves relative to bearing shell portion 32b. So that pushrods 34a and 34b are identical, orifice 54 can be formed in both; however, no dowel or other pin is inserted in orifice 54 associated with pushrod 34b.

Oil grooves 56 are provided on concave surfaces of bearing shell portions 32a and 32b. Orifices 58 are provided through bearing shell portions 32a and 32b to provide lubrication to the convex side of the bearing shell portions 32a and 32b. Oil grooves 60 are provided on the concave surfaces 40a and 40b of pushrods 34a and 34b. Oil grooves 56 and 60 extend circumferentially along the surfaces, but for only a portion of the circumference.

Figure 3:
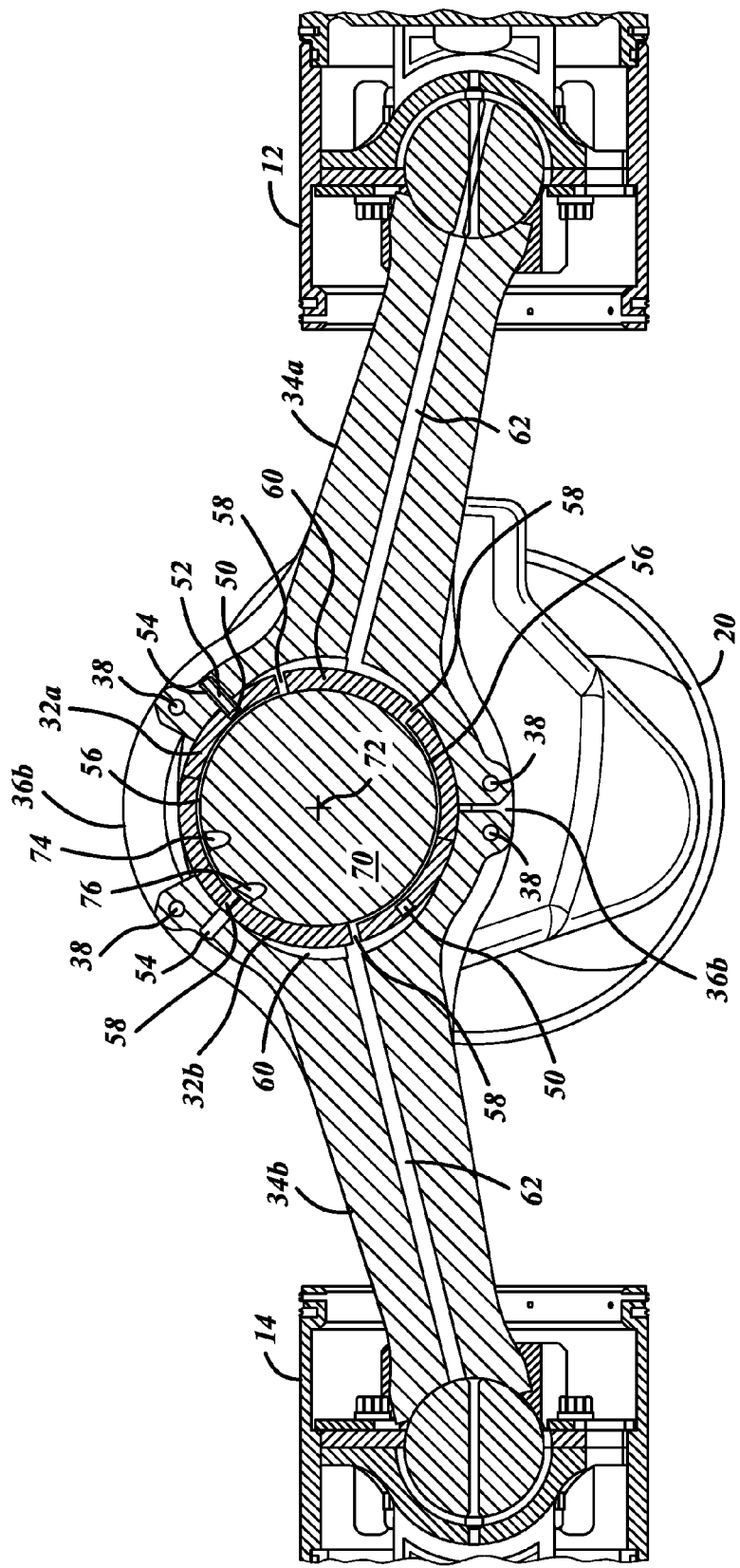
FIG. 3 illustrates a cross section of the pushrod-to-crankshaft assembly of FIG. 2 as assembled.

In FIG. 3, an assembled, inner connecting rod arrangement is shown in cross section. Bearing shell portions 32a and 32b encircle journal 70 having a central axis 72; journal 70 is a portion of crankshaft 20. Concave surfaces of pushrods 34a and 34b nest with convex surfaces of bearing shell portions 32a and 32b. Pushrods 34a and 34b connect on one end to pistons 112 and 114, respectively. During operation of the engine, pushrods 34a and 34b are almost exclusively pushed toward journal 70. However, to protect for the unusual event of the pushrods 34a and 34b being pulled, retainers 36a (not shown in this cross section) and 36b are provided and secured via screws 38.

Pushrod 34a is pinned to bearing shell portion 32a via a pin 52 inserted in pilot hole 50 in bearing shell portion 32a and orifice 54 in pushrod 34a.

Lubrication for the inner connecting rod assembly is provided through the crankshaft 20. A cross section through journal 70 of crankshaft 20 shows there are two drillings forming oil passages 74 and 76. Oil is provided to the bearing shell to journal interface and is carried to the pushrod to bearing shell interface through orifices 58 to grooves 60. Oil is further provided to the end of the pushrods proximate the pistons through drillings 62.

Figure 4:
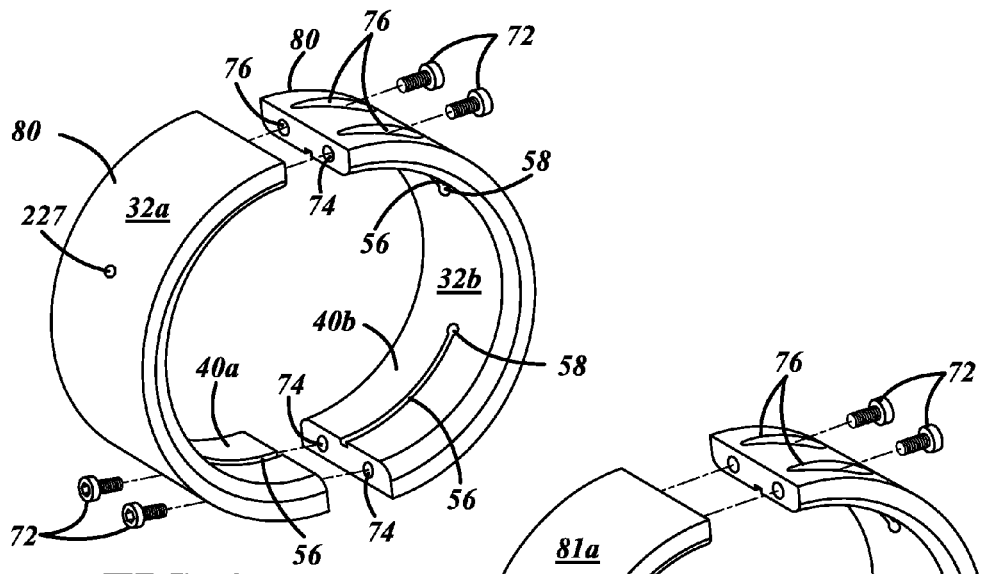
FIG. 4 illustrates the bearing shell portions of FIG. 2.

An isometric drawing of bearing shell portions 32a and 32b in an exploded view is shown in FIG. 4. Bearing shell portions 32a and 32b are fastened by screws 72 that pass into through holes 76 which are large enough to accommodate heads of screws 72 and into threaded holes 74. Oil grooves 56 are provided in concave surfaces 40a and 40b. Oil supply to lubrication grooves 60 is provided through orifices 58. Oil supplied to oil grooves 60 passes through oil holes 58 to the convex surfaces 80 of the bearing shell portions 32a and 32b.

Figure 5:
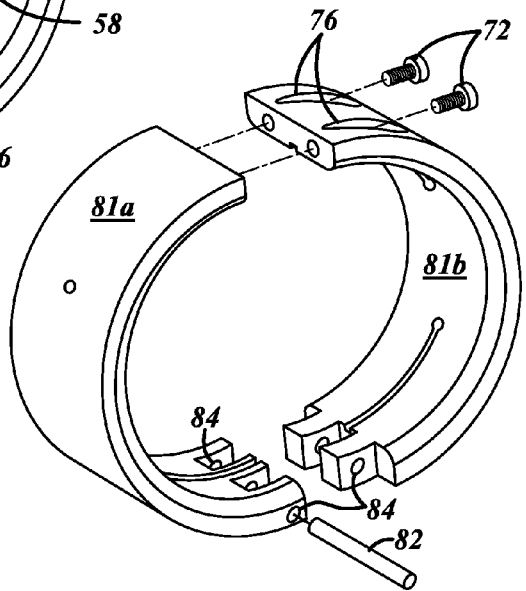
FIG. 5 illustrates an alternative embodiment to secure the bearing shell portions.

In alternative embodiment illustrated in FIG. 5, bearing shell portions 81a and 81b have interlocking fingers at one end with holes 84 through fingers so that a pin 82 may be inserted through the holes. In one embodiment, bearing shell portions 81a and 81b are installed on a journal of a crankshaft with the crankshaft having material on either side of the journal so that pin 82 cannot slide out. In other embodiments without features holding the pin in place, the pin may have a head on one end and a snap ring on the other end. Alternatively, the pin may be secured by snap rings in an internal fashion. Any suitable way of securing the pin can be used.

FIGS. 4 and 5 illustrate bearing shell portions that are fixed together. This ensures that the lubrication passes through the lubrication grooves, as described below. If the pushrod is always in compression then there is no need to secure the bearing shell portions to each other as forces in the system cause the bearing shell portions to remain pressed against the journal. Thus, in one embodiment, there are no screws or pins holding the two together. In assembly, the bearing shell portions can be held onto the journal by a thicker oil or grease until pushrods and retainers are installed. Even in a system with momentary instances of a loss of the pressure, it may be possible to withstand such short durations with a momentary loss of oil flow thereby also allowing the bearing shell portions to be installed without the screws or pins.

Figure 6:
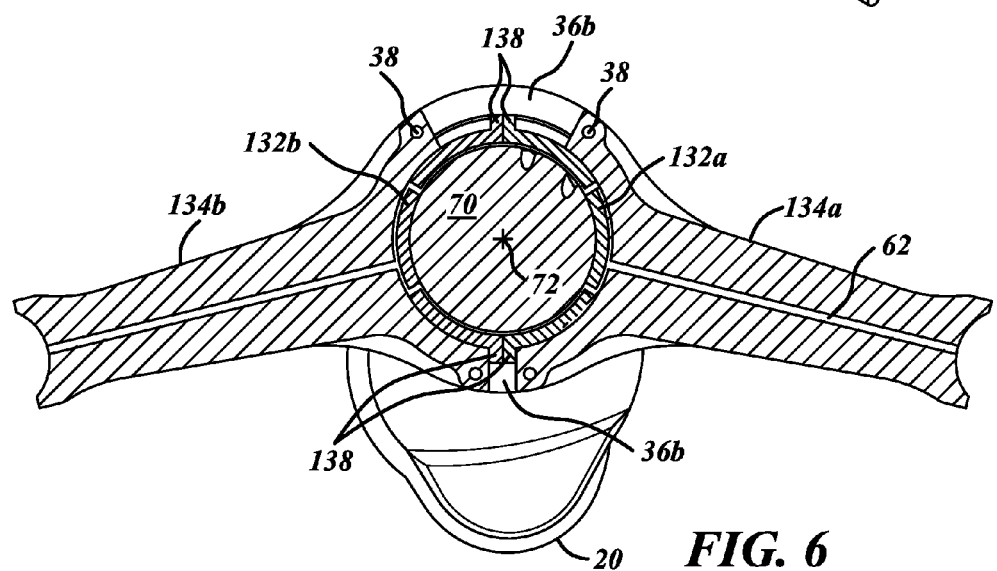
FIG. 6 illustrates a cross section of the pushrod-to-crankshaft assembly.

In FIG. 6, an alternative embodiment is shown in which the bearing shell portions 132a and 132b are allowed to float. In such embodiment, bearing shell portions 132a and 132b have tabs 138 that extend outwardly. Bearing shell portions 132a and 132b cannot float completely freely as they are kept between pushrods 134a and 134b. In FIG. 6, pushrods 134a and 134b are shown at a position at which the pushrods are the farthest away from being aligned. Above journal 70, a large gap between pushrods 134a and 134b is open. A significant section of retainer 36b can be seen. Tabs 138 that are above journal 70 (in the configuration illustrated in FIG. 6) are not restrained by the pushrods. However, tabs 138 that are below journal 70 are restrained by the pushrods. As crankshaft 20 rotates the upper portions of the pushrods close up until they restrain tabs 138 located above the journal.

An alternative embodiment of bearing shell portions 232a and 232b is shown in FIG. 7 in an exploded view. Bearing shell portions 232a and 232b are provided with orifices 234 and grooves 236. Bolts 240 engage with clips 238 and are aligned with orifices 234 to secure bearing shell portions 232a and 232b together. In this embodiment, clips 238 are U shaped with one side of the U having a through hole that aligns with one of the orifices 234 of one of the bearing shell portions. The other end of clip 238 has a threaded portion with which threads of bolt 240 engage as shown in an assembled view in FIG. 8. An end view of the assembled bearing shell portions in FIG. 9 show that clips 238 extend outwardly from bearing shell portions 232a (not visible in FIG. 28) and 232b.

Figure 11:
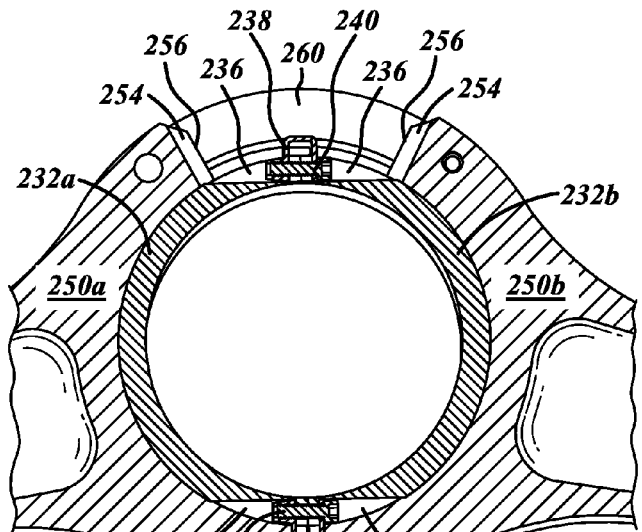
FIG. 11 is the pushrod of FIG. 10, the bearing shell potions of FIGS. 7-9, and retainers.

A pushrod 250 is shown in FIG. 10. A first end 251 couples to a piston (not shown). A concave surface 252 of pushrod 250 nests with a convex surface of one of the bearing shell portions. On either end of concave surface 252 recesses 256 are formed on either side of a protrusion 254. Recesses 256 are provided to allow space for clips 238, as can be seen in FIG. 11. In FIG. 11, portions of pushrods 250a and 250b are shown coupled onto bearing shell portions 232a and 232b. Pushrods 250a and 250b are held together via retainers 260. Pushrods 250a and 250b are shown in one extreme position where the U portion of the lower of the two clips 238 fits between the ends of pushrods 250a and 250b, i.e., the space opened up by recesses 256. The protrusions 254 of the two pushrods nearly touch in this position. As pushrods 250a and 250b move toward the other extreme position, bearing shell portions are allowed to float, although constrained between the recess surfaces 256.

The embodiment of the pushrod illustrated in FIG. 10 has a protrusion 254 between recesses 256. Alternatively, there is no such protrusion and the ends are at the height of the recesses 256. Such an embodiment is easier to machine at the expense of a portion of the bearing surface. In applications in which bearing surface area is important the embodiment in FIG. 10 or similar to such embodiment may be used. In other applications, the simpler shape without the protrusion may be used.

The embodiment shown in FIGS. 7-9 utilizes four clips 238. In an alternative embodiment, two clips are provided at one end of the bearing shell portions with the other end of the bearing shell portions coupled such as is shown in FIG. 4 or 5. In another alternative embodiment, one clip is provided at each end of the bearing shell portions with the recesses provided accordingly. In yet another embodiment, only one clip is provided at one end of the bearing shell portions.

Figure 12:
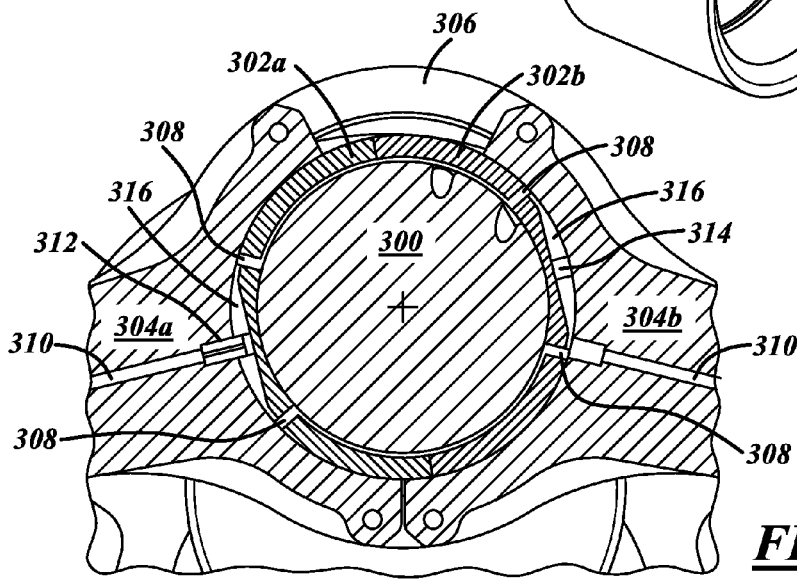
FIG. 12 is an embodiment of a pushrod to journal connection according to an embodiment of the present disclosure.

In FIG. 12, a journal 300 has bearing shell portions 302a and 302b coupled thereto. Pushrods 304a and 304b nest with bearing shell portions 302a and 302b. Retainers 306 are attached to pushrods 304a and 304b. Bearing shell portions 302a and 302b have oil holes 308 to provide oil to the back side. Pushrods 302a and 302b have oil passages 310 that are provided oil via holes 308. At the end of the oil passages proximate journal 300, the passage may be greater in diameter and a hollow pin 312 is placed in oil passage 310 of one of the pushrods, 304a in FIG. 12. Pin 312 engages with pilot hole 314 in the back side of bearing shell portion 302a. Such a pilot hole is provided also in bearing shell portion 302b to maintain consistent parts. A groove 316 is provided in bearing shell portion 302a to ensure that oil flows through pin 312 and into passage 310. Again, such a groove 316 is provided in bearing shell portion 302b even though not strictly necessary.

Figure 13:
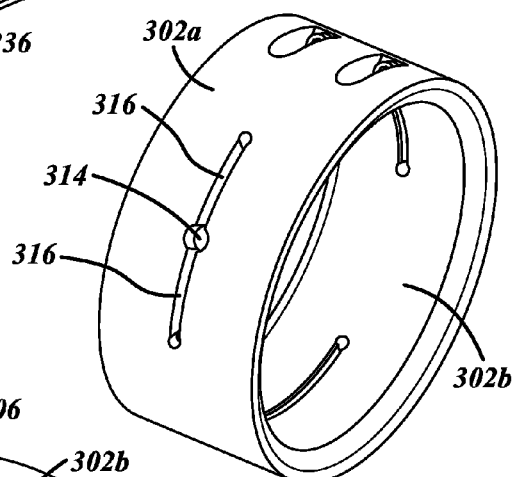
FIG. 13 is a perspective view of the bearing shell portions of FIG. 12.

In FIG. 13, bearing shell portions 302a and 302b are shown assembled and in a perspective view. Groove 316 is narrower than pilot hole 314. Pin 312, of FIG. 12, remains fixed by pilot hole 314 and cannot move into groove 316.

Figure 14:
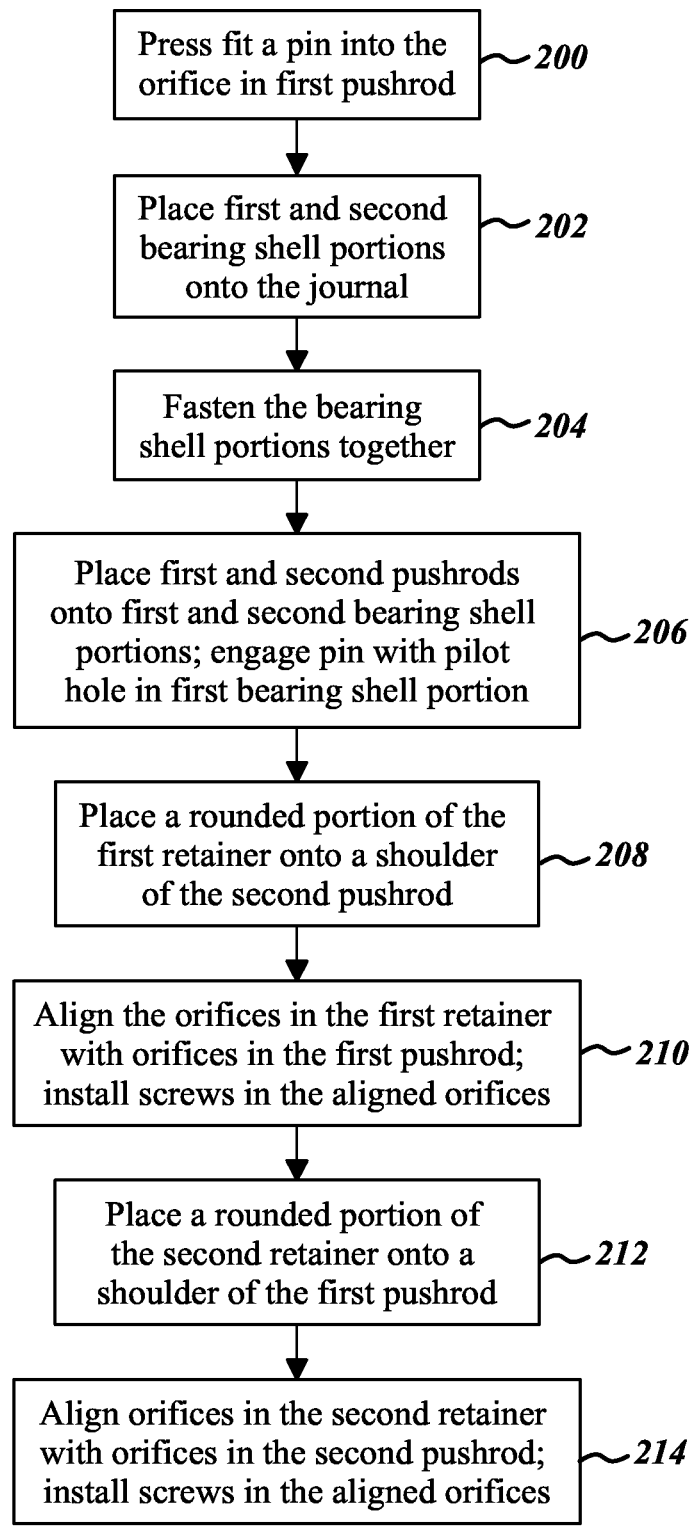
FIG. 14 is a flowchart indicating a method to assemble the connecting rods with the crankshaft.

A flowchart indicating a method to assemble the configuration of FIG. 3 is shown in FIG. 14. In block 200, pin 52 is press fit into orifice 54 of the first pushrod. In block 202 first and second bearing shell portions are placed onto the journal. In 204, the bearing shell portions are fastened together. The first and second pushrods are placed onto first and second bearing shell portions in 206 with pin 52 engaging with pilot hole 50 in the first bearing shell portion. A rounded portion of a first of the two retainers is engaged with a shoulder on the second pushrod in 208. Orifices in the tips of the first retainer are aligned with orifices in the first pushrod in 210; screws are installed in the aligned orifices. Similarly, a rounded portion of the second retainer is engaged with a shoulder of the first pushrod in 212. In 214, orifices in the second retainer are aligned with orifices in the second pushrod so that screws can be installed in the aligned orifices.

In embodiments in which both bearing shell portions are allowed to float with respect to the pushrods, the portions of the flowchart in FIG. 14 in which pin is press fit into the pushrod, block 200, and the pin is engaged with the orifice in the bearing shell portion, i.e. part of block 206, are obviated.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A journal-connecting rod assembly, comprising:
a one-piece crankshaft having at least three cylindrical journals;
first and second bearing shell portions placed on one of the journals;
a first pushrod placed over the first bearing shell portion;
a second pushrod placed over the second bearing shell portion;
a first retainer coupled to the first pushrod; and
a second retainer coupled to the second pushrod, wherein:
first and second retainers are U-shaped;
each pushrod forms a portion of a cylinder at an end of the pushrod proximate the journal;
each pushrod includes a shoulder;
a concave portion of the U of the first retainer couples with the shoulder associated with the second pushrod; and
a concave portion of the U of the second retainer couples with the shoulder associated with the first pushrod.

2. The assembly of claim 1 wherein the first and second retainers have orifices defined in each tip of the U;
two orifices defined in each of the pushrods, one located in each end of the cylinder;
the orifices are parallel to a central axis of the journal; and one of the orifices of the retainers aligned with one of the orifices of the pushrod, the assembly further comprising:
a pin inserted through each of the pairs of aligned orifices.

3. A journal-connecting rod assembly, comprising:
a one-piece crankshaft having at least three cylindrical journals;
first and second bearing shell portions placed on one of the journals;
a first pushrod placed over the first bearing shell portion;
a second pushrod placed over the second bearing shell portion;
a pilot hole in a concave surface of the first bearing shell portion, an axis of the pilot hole being approximately perpendicular with a central axis of the journal;
a dowel pin placed in the pilot hole and extending outwardly from the first bearing shell portion; and
an orifice in the first pushrod, the orifice being approximately perpendicular with the central axis of the journal wherein the orifice engages with the dowel pin.

4. The assembly of claim 3 wherein relative rotational motion of the first bearing shell portion with respect to the first pushrod is substantially prevented by the pin engaging with the pilot hole in the first bearing shell portion and the orifice in the first pushrod.

5. The assembly of claim 3 wherein the first bearing shell portion and the second bearing shell portion have fingers extending circumferentially from at least one end of each the first and second bearing shell portions;
an orifice is defined in the fingers with an axis of the orifice being substantially parallel to a central axis of the journal; and
the fingers of the first and second bearing shell portions are enmeshed to form a box joint, the assembly further comprising: a dowel pin inserted through the orifices in the enmeshed fingers.

6. The assembly of claim 3 wherein the outer surfaces of the bearing shell portions are substantially convex and sit away from the journal a predetermined amount except in the region proximate where the first and second bearing shell portions fasten together in which at least one of the bearing shell portions has an outward protrusion and the outward protrusion indexes with a gap between the first and second pushrods.

7. The assembly of claim 3, further comprising a first through-hole orifice defined in the first bearing shell portion near a first end of the first bearing shell portion;
a second through-hole orifice defined in the second bearing shell portion near a first end of the second bearing shell portion;
a first U-shaped clip defining an orifice at one tip and having a threaded portion at the other tip; and
a first bolt wherein the first bolt passes through the orifice at one tip of the first clip, through the first through-hole orifice, through the second through-hole orifice, and threads into the threaded portion of the first clip.

8. The assembly of claim 7, further comprising:
a third through-hole orifice defined in the first bearing shell portion near a second end of the first bearing shell portion;
a fourth through-hole orifice defined in the second bearing shell portion near a second end of the second bearing shell portion;
a first U-shaped clip defining an orifice at one tip and having a threaded portion at the other tip; and
a first bolt wherein the second bolt passes through the orifice at one tip of the second clip, through the third through-hole orifice, through the fourth through-hole orifice, and threads into the threaded portion of the second clip.

9. A journal-connecting rod assembly, comprising:
a one-piece crankshaft having at least three cylindrical journals;
first and second bearing shell portions placed on one of the journals;
a first pushrod placed over the first bearing shell portion;
a second pushrod placed over the second bearing shell portion;
wherein the first bearing shell portion has first and second oil holes located roughly 60 degrees from first and second ends of the first bearing shell portion, respectively;
an inner surface of the first bearing shell portion has a first annular oil groove extending from the first end of the first bearing shell portion to the first oil hole; and
the inner surface of the first bearing shell portion has a second annular oil groove extending from the second end of the first bearing shell portion to the second oil hole.

10. A journal-connecting rod assembly, comprising:
a one-piece crankshaft having at least three cylindrical journals;
first and second bearing shell portions placed on one of the journals;
a first pushrod placed over the first bearing shell portion;
a second pushrod placed over the second bearing shell portion;
wherein each of the first and second pushrods forms a portion of a cylinder at an end of the pushrod proximate the journal, a concave surface of the cylinder on the pushrods defines a circumferential groove over about 60 degrees of the circumference.

11. A method to assemble two connecting rods onto a journal of a crankshaft, the method comprising:
placing first and second portions of a bearing shell onto the journal;
placing a first pushrod over the first bearing shell portion;
placing a second pushrod over the second bearing shell portion; and
installing a in into an orifice in the first pushrod and engaging the in with a pilot hole in the first bearing shell portion to substantially prevent relative movement between the first pushrod and the first bearing shell portion.

12. The method of claim 11, further comprising:
placing a first retainer over the journal opposite the first pushrod;
placing a second retainer over the journal opposite the second pushrod;
aligning orifices in the retainers with the orifices in the pushrods; and
installing screws in the aligned orifices.

13. The method of claim 11, further comprising: fastening the two bearing shell portions together.

\* \* \* \* \*